Apr. 24, 1923. Re. 15,585

C. F. SAUEREISEN

INSULATOR

Original Filed March 24, 1920

WITNESSES

J. Herbert Bradley.

INVENTOR

Christian F. Sauereisen

By Green & McCallister.

His Attorneys.

Reissued Apr. 24, 1923. Re. 15,585

UNITED STATES PATENT OFFICE.

CHRISTIAN F. SAUEREISEN, OF PITTSBURGH, PENNSYLVANIA.

INSULATOR.

Original No. 1,355,272, dated October 12, 1920, Serial No. 368,476, filed March 24, 1920. Application for reissue filed March 1, 1922. Serial No. 540,340.

*To all whom it may concern:*

Be it known that I, CHRISTIAN F. SAUEREISEN, a citizen of the United States, and a resident of Pittsburgh, in the county of Allegheny and State of Pennsylvania, have made a new and useful Invention in Insulators, of which the following is a specification.

My invention relates to insulators and consists in a novel construction of the insulator surface which increases the efficiency of the insulator when used in connection with high tension currents and especially when in use in high temperatures.

Most insulators have any exposed portion of their surface glazed to prevent the accumulation of foreign material thereon which would tend to form a short circulating conductor. To provide a glazed surface certain vitreous ingredients are used which differ from the ingredients of the bisque material of the remainder of the insulator. When heated to high temperatures, a surface of bisque material becomes conductive of high tension currents but a glazed surface becomes conductive of the same current at far lower temperatures than an unglazed surface. This disadvantage of the glazed surface has been borne hitherto because of the greater objection to an exposed unglazed surface which retains dust, oil and other foreign matter adapted to form an undesirable conductor.

The main object of my invention is to retain the advantages of a glazed, dirt shedding surface and the unglazed-surface quality of being non-conducting at higher temperatures than will be withstood, non-conductivity, by the glazed surfaces.

Extensive glazed surfaces do not readily expand and contract and are subject to crazing or cracking at high temperatures, while unglazed surfaces will endure the same temperatures without so deteriorating because of their expansive qualities. Another object of my invention is to produce an insulator which is provided with glazed surfaces adapted to function in the usual manner but in which those portions subjected to the highest temperatures are unglazed to permit expansion and contraction.

Figure 1:
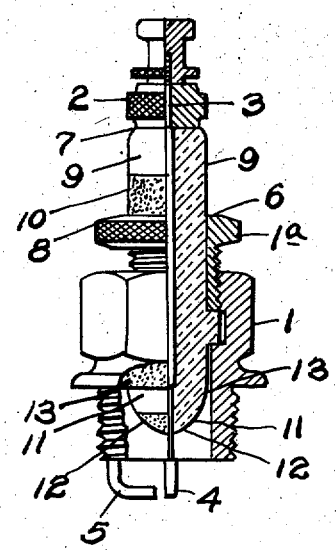
Figure 3:
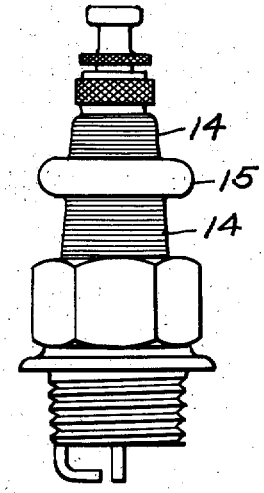
Figure 2:
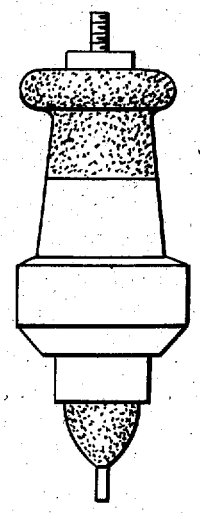

To illustrate a preferred embodiment of my invention, I have shown it as applied to spark plugs. Figure 1 of the accompanying drawings is half view and half longitudinal section through a spark plug equipped with a porcelain insulator of my improved construction; Fig. 2 is an elevation of a modified insulating porcelain for a spark plug, and Fig. 3 is a view of a spark plug in which the insulator consists of mica and glass.

The spark plug shown in Fig. 1 includes a metallic shell 1 with cooperating clamp portion 1[a], a binding post 2 which is provided with an axially disposed electrode 3 terminating in a spark point 4 spaced from a cooperating spark point 5 mounted on shell 1. Spacing electrode 3 from shell 1 is a poreclain insulator 6. It will be understood that this spark plug functions by connecting post 3 to a current source and grounding shell 1 in the wall of an engine cylinder thereby completing a circuit which, when closed by suitable timing mechanism, will produce a gas igniting spark at the gap between points 3 and 4.

Obviously any circuit between binding post 2 and shell 1 which does not include spark points 4 and 5 will render the plug inoperative. It will be noted that the surface of insulator 6 has a ring contact with the binding post at 7 and with the shell at 8. If a continuous layer or streak of dirt should extend along the insulator surface between these two rings, a circuit would be completed thereby with the results indicated above. To prevent this I glaze a band or zone 9 on insulator 6 adjacent post 2 but substantially spaced from shell portion 1[a] by a band or zone 10 of unglazed or bisque surface.

Foreign matter will slide or jar off of the vitreous zone 9 and a short circuit between the binding post and shell is thus prevented. When the spark plug is operating in high temperatures, as produced in airplane engines for example, the ingredients which form the polished or glazed surface become electrically conductive; hence if all the surface from the binding post to the shell were vitrified, the plug would be likely to short circuit at the high temperature although safe from such action at the lower temperatures. To prevent this happening I provide the unglazed zone 10.

Similarly: within shell 1 the lower part of insulator 6 has a zone 11 which is glazed and spaced from the lower part of electrode 3 and the insulator-contacting part of shell 1 by unglazed zones 12 and 13 respectively. The deposit of a continuous line of carbon between shell 1 and electrode 3 is prevented by the slick zone 11 and a conducting surface of fusing or near fusing, glazing material when the plug is heated, is prevented by zones 12 and 13.

The hottest part of the insulator is at the lower part of the plug and at the contact of same with the shell. Both of these portions of the insulator have a bisque surface which permits greater expansion and contraction than would be permitted by a glazed surface.

I have tested the advantages of the alternate glazed and unglazed surfaces by taking a spark plug of standard make which was provided with a continuous glazed surface and assembling same with the ignition system of an automobile and starting the plug sparking within a furnace. Upon successive tests the plug ceased sparking when the furnace temperatures were between 900 and 1300 degrees Fahrenheit. Thereafter a bisque surface was ground around the porcelain which protruded from the shell and the plug again assembled as before. The temperatures then produced in the furnace before the plug ceased sparking ranged from 1700 to 1800 degrees Fahrenheit.

In Fig. 2 I show a modified insulator which would admit of more economical manufacturing methods. Either end could be dipped in paraffin and, after cooling, the plug could be dipped, paraffin end down, in a glazing mixture, to the depth indicated, and then fired. In the insulator shown in Fig. 1, bands 9 and 11 must be applied by brush or similar means which is a more expensive production operation.

In Fig. 3 I show a modified insulator which is in part built up of a plurality of mica sheets 14 cemented or clamped together and the edges of which form the unglazed surface corresponding in function to the bisque surface 10 in the insulator shown in Fig. 1. Separating the built up sections of mica is a glass section 15 having a surface corresponding in function to the glazed surface 9 in the insulator shown in Fig. 1.

I am aware of the adaptability of my invention to insulators generally and do not wish to limit myself to its application to spark plug insulators. I realize the numerous arrangements of glazed and unglazed zones possible without departing from the spirit of my invention and I contemplate such modifications in its commercial development.

I claim:—

1. An insulating body provided with an exposed surface and adapted to insulate two electrodes which contact with said surface at spaced points; said surface including a glazed zone and an unglazed zone between said points.

2. An insulator provided with an exposed surface adapted to contact at spaced points with opposed electrodes and comprising alternate glazed and unglazed areas between said points, each of said areas being adapted to act as a barrier to conduction of electrical current between said points, over said surface, under conditions favorable to such conduction by the other of said areas.

3. In combination, a conductor of electricity, a second conductor of electricity spaced therefrom, and an insulator between said conductors, the surface of said insulator, between said conductors, comprising glazed and unglazed areas.

4. In combination, a charged, electric conductor, an uncharged, electric conductor adjacent same but spaced therefrom, and an insulator between said conductors; the surface of said insulator contacting with each of said conductors and that portion of said surface between said conductors including a complete band of glazed material separating said conductors and a complete band of unglazed material separating said conductors.

5. In a spark plug, a shell provided with a spark point, an electrode spaced from said shell by a vitreous insulator mounted on said shell and provided with a spark point adjacent said shell spark point, the surface of said insulator contacting with said shell and with said electrode and between said contacts being provided with an unbroken ring of glazed material and an unbroken ring of unglazed material.

6. An insulating body having a continuous surface and adapted to insulate two electrodes at spaced points on said surface; said surface having a complete zone of glazed material, acting as a barrier to prevent adhesion of material forming a closed circuit between said electrodes, and a complete zone of unglazed material to prevent a closed circuit between said electrodes when said body is heated to a temperature sufficient to fuse said glazed material.

7. In a spark plug, a grounding element, a current supply element, terminals for each of said elements, and a porcelain insulator between said elements having a zone of glazed porcelain about its surface and a zone of unglazed porcelain about its surface; said zones being located between said elements.

8. In a spark plug, a threaded shell, a binding post, a terminal on said binding post, a terminal on said binding post extending through said shell and spaced therefrom by an insulator; the surface of said insulator between said post and said shell comprising alternate bands of glazed and unglazed materials.

9. A spark plug including a shell structure, a glazed porcelain, retaining means carried by said shell structure for engaging the porcelain, an electrode passing through the porcelain and projecting at each end thereof, there being an unglazed portion between the retaining means and each end of said porcelain to more completely break electrical connection between the shell and both ends of the electrode.

10. In a device of the class described, a porcelain insulator provided with means for receiving an electrical conductor and having glazed and unglazed portions thereon. and a support for said insulator engaging said unglazed portion only.

11. A porcelain insulator for spark plugs, having a circumferential rib intermediate its ends with alternate glazed and unglazed encircling areas between said rib and each end of the porcelain.

12. A porcelain insulator for spark plugs, having a circumferential rib intermediate its ends, an unglazed encircling area including said rib and extending a distance on each side thereof and encircling glazed areas on each side of said unglazed area.

13. A spark plug porcelain pierced from end to end to receive a central electrode and having an intermediate circumferential rib with unglazed circumference and end surfaces and continuous encircling glazed areas between said rib and the ends of the porcelain.

In testimony whereof, I have hereunto subscribed my name this 15th day of February 1922.

CHRISTIAN F. SAUEREISEN.